(No Model.) 3 Sheets—Sheet 1.
O. HANSON & P. LOBBEN.
VELOCIPEDE.
No. 420,059. Patented Jan. 28, 1890.
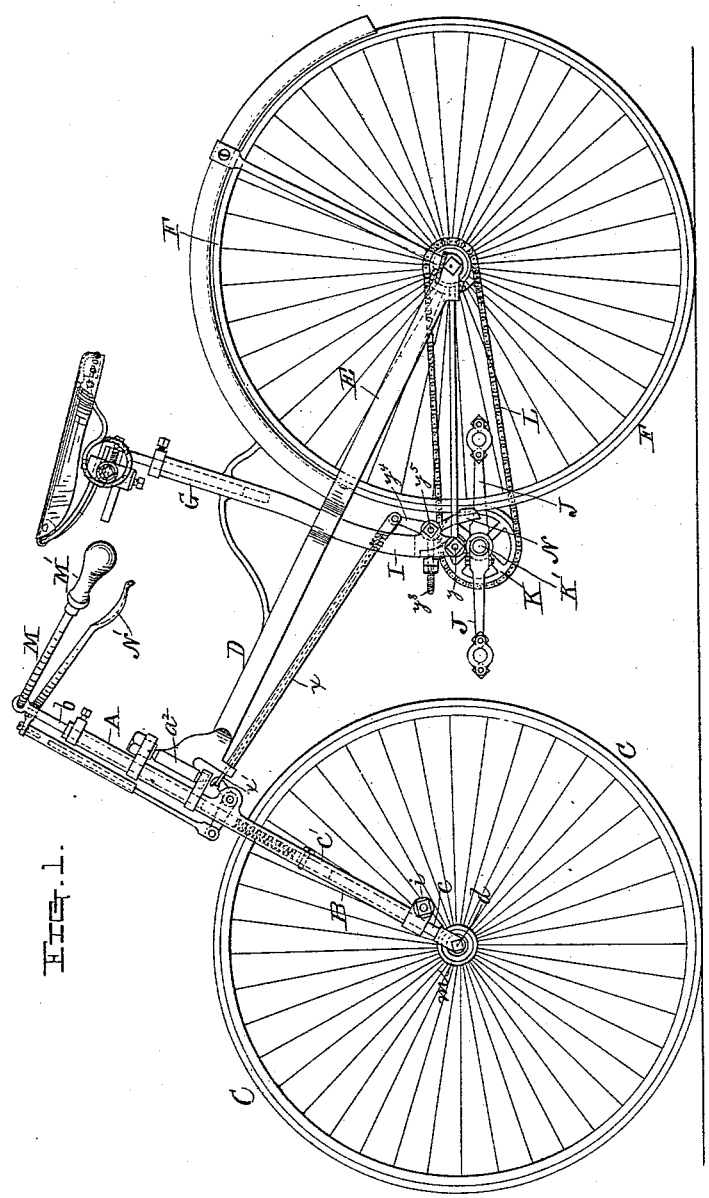

(No Model.) 3 Sheets—Sheet 2.
O. HANSON & P. LOBBEN.
VELOCIPEDE.
No. 420,059. Patented Jan. 28, 1890.
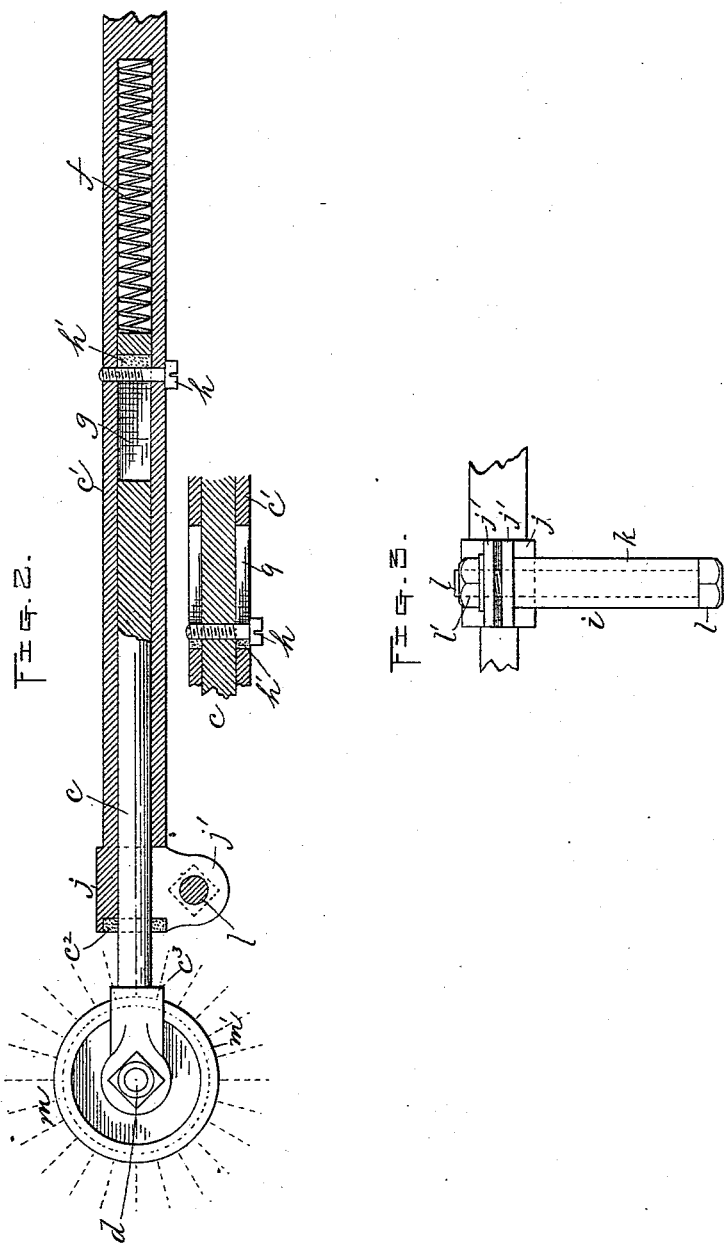

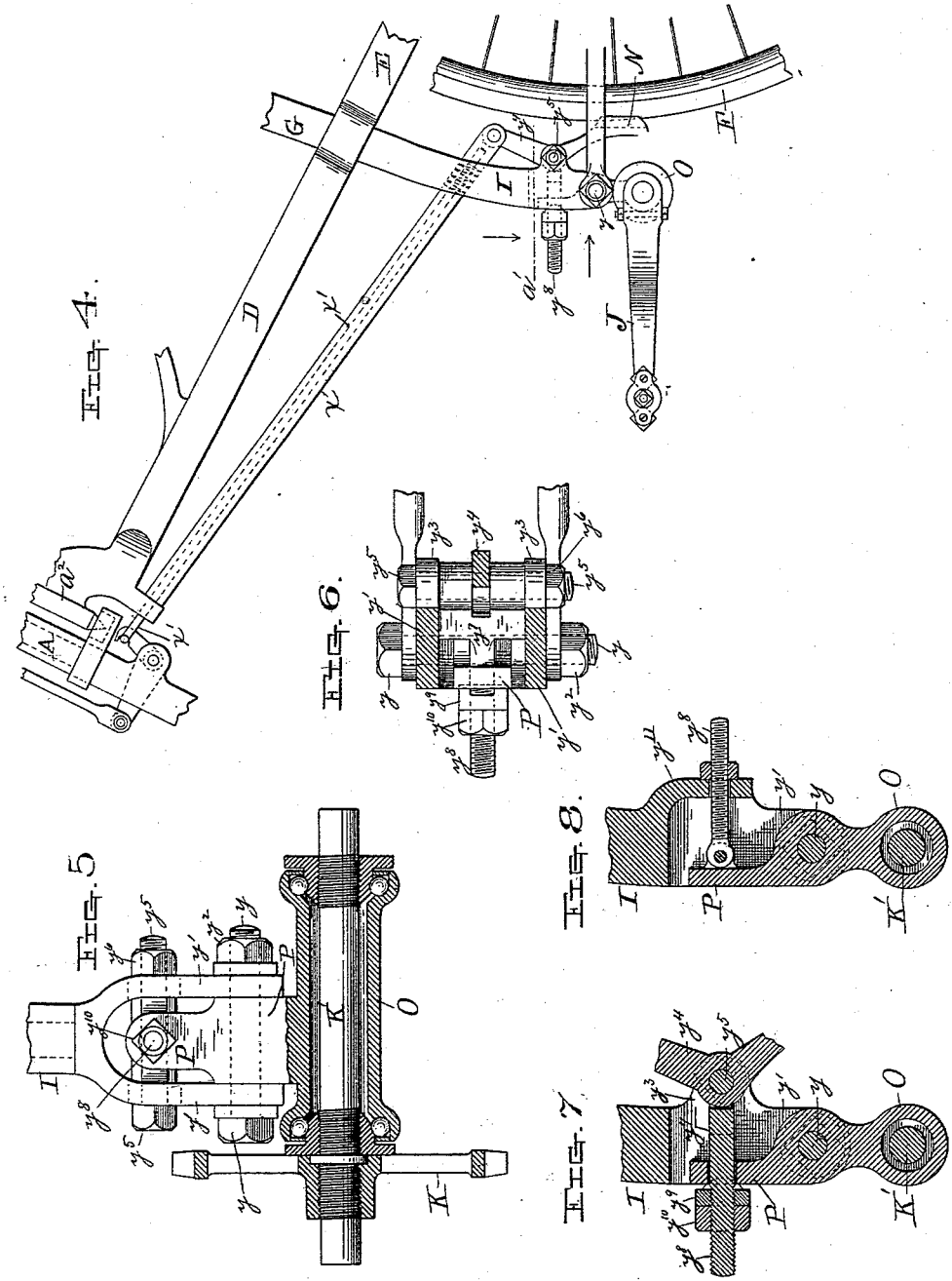

UNITED STATES PATENT OFFICE.

OLAUS HANSON AND PEDER LOBBEN, OF WORCESTER, MASSACHUSETTS, ASSIGNORS TO IVER JOHNSON, OF SAME PLACE.

VELOCIPEDE.

SPECIFICATION forming part of Letters Patent No. 420,059, dated January 28, 1890.

Application filed November 1, 1888. Serial No. 289,754. (No model.)

*To all whom it may concern:*

Be it known that we, OLAUS HANSON and PEDER LOBBEN, both citizens of the United States, residing at Worcester, in the county of Worcester and State of Massachusetts, have invented certain new and useful Improvements in Velocipedes; and we do hereby declare that the following is a full, clear, and exact description thereof, reference being had to the accompanying drawings, forming a part of this specification, and in which—

Figure 1 represents a side view of a bicycle embodying our improvements. All the following figures are upon an enlarged scale. Fig. 2 is a side view of the front-wheel bearing and hub and a central longitudinal section through one arm of the front fork. Fig. 3 is a plan of the under side of one of the foot-rests and part of the front fork. Fig. 4 represents a side view of so much of the bicycle as is necessary to illustrate our improvements in the brake mechanism and driving-chain-adjusting device. Fig. 5 is a vertical longitudinal section through the bearing for the front sprocket-wheel and crank-lever and a front view of said chain-adjusting device. Fig. 6 is a horizontal section, looking down, of the chain-adjusting device, taken on line $a'$, Fig. 4. Fig. 7 is a vertical longitudinal section thereof and a cross-section of the bearing for the front sprocket-wheel and crank-lever bearing, and Fig. 8 is a similar view to Fig. 7 with the brake-lever and one of the nuts on the screw-rod left off.

Our invention relates to what are commonly known in the market as "Safety" velocipedes, and more particularly to bicycles, although it is equally as applicable to tricycles.

It consists in the following improvements: first, in the construction of the front fork; second, in the brake mechanism, and, third, in the mechanism for adjusting the driving-chain, as hereinafter more fully set forth.

To enable those skilled in the art to which our invention appertains to better understand the nature and purpose thereof, we will now proceed to first give a brief description of the whole machine and then a detailed description of the improvements thereon.

Referring to the drawings, A represents the front upper frame, having the front fork B extending down therefrom to form a bearing for the front wheel C.

D is the backbone, pivoted at $a^2$ to the front frame, and having the rear fork E extending back and down therefrom to form a bearing for the rear wheel F, said backbone also having the arm G extending up to form a support for the seat H and the arm I extending down to form a bearing for the cranks J J and the sprocket-wheel K, over which is passed the driving-chain L.

The part M is the handle-bar, provided with handles M', and having connection through the rod $b$ with the front fork for guiding the machine, and N is the brake, adapted to bear upon the front of the rear wheel, and having suitable connections with its handle N', arranged, as usual, under one of the handles M'.

Our improved front fork is constructed in the following manner, (see Fig. 2:) Each arm $c'$ thereof is made hollow and straight nearly to the wheel-hub, and within said hollow arm or tube is fitted a rod or spindle $c$, connected at its lower end with the wheel-axle $d$ and extending up about two-thirds the length of the arm. Between the upper end of said rod or spindle $c$ and the upper end of the longitudinal opening in the arm is fitted a spiral spring $f$, for exerting a force upon the rod and arm opposite from each other; and to prevent said spring from forcing the spindle out of the arm the upper end of said spindle is provided with a transverse slot $g$, through which a transverse holding-screw $h$, fastened in the arm, is passed. When in their normal positions the spindle at the upper end of its transverse slot bears against said screw, therefore holding the parts in position when not in use and admitting of a downward yielding or spring movement when a downward pressure is applied upon the spring, the screw moving up and down in the slot as said spring is compressed or expands. In order that the noise incident to the screw $h$ striking at the upper end of the slot in the spindle when the spring is compressed and then suddenly allowed to expand may be obviated, a cushion or pad $h'$, of suitable soft material, is preferably interposed between the screw and said striking-point; but we do not limit ourselves thereto. By the above construction it is obvious that the rider in passing over stones or other similar obstructions is relieved from any unpleasantness or liability to injury from sudden concussions or shocks produced thereby. Said result may also be facilitated by securing a cushion or pad $c^2$ in the lower end of each hollow arm, adapted to strike against the stop or shoulder $c^3$ of each spindle $c$. A spring-fork, whereby said result is effected, we are aware, is not new, however, and therefore make no claim, broadly, thereto. If desired, an equivalent result to that above described may be effected by forming slots in the hollow arms or tubes of the fork corresponding to the slot $g$ in the spindle, and fastening the screw $h$ in said spindle instead of the arm. We reserve the right to make such modification therein. Each arm is, in practice, preferably provided with a foot-rest $i$, extending laterally, as usual, from the machine; but we do not limit ourselves thereto, the same not constituting an essential feature to this part of our invention. In this instance said foot-rests are secured to the lower ends of the hollow arms or tubes of the forks, as is indicated in Figs. 1 and 5, by forming a ring or collar $j$ on each arm and two flanges $j'$ $j'$ projecting from the under side of the arm, to which is secured at right angles the tube $k$ by means of a bolt $l$, passed through said tube and flanges and fastened by a set-nut $l'$. If preferred, any equivalent construction for obtaining the same result may be employed in lieu of the above.

The lower ends of the hollow arms may be clamped tight to the spindles $c$ by turning the nuts up tight, if desired, and thus produce a rigid or stiff fork instead of a spring-fork, the flanges being made with an open space between them, and the collars $j$ secured to the arms only at the back to admit of said tightening operation.

Our improvement in the brake mechanism consists in fitting a tube $x$ over the connecting-rod $x'$, extending from that part of said mechanism attached to the front frame and that which is adjacent to the brake proper N, the main purpose of which is to protect said rod from being bent while the machine is in use or in transportation; and, finally, our improvement in the mechanism for adjusting the driving-chain is as follows:

Upon the usual rear-wheel bearing O is formed an upwardly-turned flange P, which is pivoted by means of the bolt $y$ to the lower end of the arm I, extending down from the backbone D, as previously described, said lower end of arm I being made with two downwardly-projecting flanges $y'$ $y'$ or fork-shaped to receive said flange P. The pivot-bolt $y$ is passed transversely through said flanges $y'$ $y'$ and P and is fastened by the nut $y^2$. Two flanges $y^3$ $y^3$, projecting rearward, are also formed on the lower end of arm I to obtain a bearing for the brake-lever $y^4$, which is pivoted on a bolt $y^5$, passed transversely through the parts and fastened by the nut $y^6$. Upon the brake-lever pivot $y^5$ is hinged a tongue-piece $y^7$, which projects forward and is provided with the screw part $y^8$. Said screw part passes through a smooth longitudinal opening in the upper end of the flange P, and is preferably provided with both a holding and set nut $y^9$ $y^{10}$; but, if desired, only one nut may be used. The sprocket-wheel K is arranged on the same shaft K' as the crank-levers J, and the driving-chain L is passed over said sprocket-wheel and the sprocket-wheel on the rear-wheel axle, as usual. Therefore, as the crank-lever shaft turns in the bearing upon which the flange P is formed, and said bearing part is pivoted, as previously described, it is obvious that when the upper end of the flange P is moved toward the rear wheel the lower end or bearing is moved in the opposite direction, and consequently tightens up the chain. Said operation is performed, as the chain becomes slack by use, by turning up the nuts against the flange P, or loosened to remove said chain by reversing the operation.

It is obvious that, as the pivot-bolt $y^5$ is held rigid in the flanges $y^3$ $y^3$ of arm I, and said tongue-piece $y^7$ hinged to said pivot, said tongue-piece is held against longitudinal motion when the nuts $y^9$ $y^{10}$ are turned up against flange P, as and for the purpose above described. The brake-lever is in this instance arranged centrally on the pivot-bolt $y^5$ in a vertical slot formed in the hub of the tongue-piece $y^7$.

It will be understood that we make no claim to the construction of the bearing proper O, our improvement consisting only in making said bearing separate from the arm I and forming the flange P thereon, in connection with the other parts above described, whereby the chain may be tightened or loosened, as aforesaid. An additional advantage of thus making the bearing part separate from the supporting-arm I is that when the bearing requires renewal a new bearing may be supplied and fitted in place at a comparatively small expense.

For the purpose of convenience and economy in space we prefer in practice to pivot both the brake-lever and screw-rod $y^8$ on the same pivot, as previously described; but as said brake-lever constitutes no part of the chain-adjusting mechanism we reserve the right to dispense with the same in said mechanism, as well as one of the nuts on said screw-rod, as is shown in Fig. 8.

We are aware of the United States patents to H. J. Lawson, No. 345,851, dated July 20, 1886, and to E. G. Latta, No. 377,204, dated January 31, 1888, for improvements in velocipedes, in both of which is shown a chain-adjusting device. We make no claim to the constructions therein set forth, but limit our invention to the specific construction pointed out in our claims.

Having now fully described our invention, what we claim therein as new, and desire to secure by Letters Patent, is—

1. In a velocipede, the combination of the front-wheel axle with the rod or spindle $c$, pivoted to said axle, the hollow arm or tube $c'$ of the front fork, fitted over said rod or spindle and having the foot-rest $i$ secured to its lower end, the holding-screw $h$, passed transversely through the rod and hollow arm, and spring $f$, having a bearing against said rod and hollow arm, substantially as and for the purpose set forth.

2. In a velocipede front fork, the combination of the spindle $c$, having a stop or shoulder $c^3$ at its lower end, with the hollow arm $c'$, having the cushion at its lower end, the spring $f$ in said arm, adapted to bear against the upper end of said spindle, and the holding-screw $h$, substantially as and for the purpose set forth.

3. In a velocipede front fork, the combination of the spindle $c$ with the hollow arm $c'$, having the clamp and cushion at its lower end, substantially as described, the spring $f$ in said arm, adapted to bear against the upper end of said spindle, and the holding-screw $h$, substantially as and for the purpose set forth.

4. In a velocipede, the combination of the connecting-rod $x'$, for connecting that part of the brake mechanism arranged on the front frame with that which engages with the brake proper in front of the rear wheel, with a protecting-tube $x$ fitted over said rod, substantially as shown and described.

5. In a velocipede, the combination of the arm I, extending downward from the backbone D, and having the flanges $y'$ $y'$ and $y^3$ $y^3$ projecting down and back therefrom, respectively, with the bearing O, having the flange P projecting up therefrom, the pivot $y$, pivot $y^5$, brake-lever $y^4$, tongue-piece $y^7$, having the screw part $y^8$ passing through a smooth longitudinal opening in the upper end of flange P, and one or more adjusting and holding nuts $y^9$ $y^{10}$, substantially as and for the purpose set forth.

6. In a velocipede, the combination of the arm I, extending downward from the backbone D and having the flanges $y'$ $y'$ projecting down therefrom, with the bearing O, having the flange P projecting up therefrom, the pivot $y$, pivot $y^5$, tongue-piece $y^7$, having the screw part $y^8$ passing through a smooth opening in the upper end of flange P, and one or more adjusting and holding nuts $y^9$ $y^{10}$, substantially as and for the purpose set forth.

7. In a velocipede, the rigid arm I, projecting down from the backbone and having downwardly-projecting holding-flanges at each side of its lower end, in combination with the rocking bearing O, arranged between said flanges and pivoted at about its center on a transverse pin held in the lower ends of the flanges, an adjustable holding-screw $y^8$, and suitable holding-nuts, combined with the upper end of the bearing O and with the rigid arm I, substantially as described, sprocket-wheel K, mounted on a transverse shaft K' in the lower end of bearing O, and chain L, connecting said sprocket-wheel with the sprocket-wheel on the rear-wheel axle, substantially as and for the purpose set forth.

OLAUS HANSON.
PEDER LOBBEN.

Witnesses:
A. A. BARKER,
W. B. NOURSE.